(12) United States Patent
Nakamura et al.

(10) Patent No.: US 10,908,095 B2
(45) Date of Patent: *Feb. 2, 2021

(54) INSPECTION DEVICE

(71) Applicant: DENSO CORPORATION, Kariya (JP)

(72) Inventors: Kohei Nakamura, Kariya (JP);
Katsuhiro Miyagaki, Kariya (JP);
Hiroyuki Iwatsuki, Kariya (JP); Shinji Kato, Kariya (JP); Masaru Horiguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,764

(22) Filed: Mar. 25, 2019

(65) Prior Publication Data

US 2019/0219518 A1 Jul. 18, 2019

Related U.S. Application Data

(63) Continuation of application No. PCT/JP2017/034894, filed on Sep. 27, 2017.

(30) Foreign Application Priority Data

Sep. 28, 2016 (JP) ................... 2016-190100

(51) Int. Cl.
*G01N 21/89* (2006.01)
*G01B 11/30* (2006.01)
(Continued)

(52) U.S. Cl.
CPC .............. *G01N 21/89* (2013.01); *G01B 11/26* (2013.01); *G01B 11/30* (2013.01);
(Continued)

(58) Field of Classification Search
CPC ............... G01N 21/89; G01N 21/8806; G01N 21/8803; G01B 11/26; G01B 11/30;
(Continued)

(56) References Cited

U.S. PATENT DOCUMENTS

| 2004/0183751 | A1* | 9/2004 | Dempski | ............... | G02B 27/017 |
| | | | | | 345/8 |
| 2014/0267775 | A1* | 9/2014 | Lablans | ................. | H04N 5/247 |
| | | | | | 348/169 |

(Continued)

FOREIGN PATENT DOCUMENTS

| JP | 2016058038 A | 4/2016 |
| JP | 2016122115 A | 7/2016 |
| JP | 2016122918 A | 7/2016 |

OTHER PUBLICATIONS

U.S. Appl. No. 16/362,775, filed Mar. 25, 2019, Horiguchi et al.
(Continued)

*Primary Examiner* — Tri T Ton
(74) *Attorney, Agent, or Firm* — Harness, Dickey & Pierce, P.L.C.

(57) ABSTRACT

An inspection device of the present disclosure may include an image acquisition unit that acquires image data including an inspection object, the image data being captured by a wearable camera attached to a worker inspecting the inspection object, an inspection state acquisition unit that acquires inspection state information for calculating at least one of a deviation distance from a regulation distance or a deviation angle from a regulation angle with respect to the inspection object of the worker, and an image correction unit that calculates at least one of the deviation distance or the deviation angle based on the image data and the inspection state information and corrects the image data.

5 Claims, 9 Drawing Sheets

(51) Int. Cl.
*G01B 11/26* (2006.01)
*G01N 21/88* (2006.01)
*H04N 5/225* (2006.01)
*H04N 5/232* (2006.01)
*H04N 5/91* (2006.01)
*G03B 17/56* (2021.01)
*H04N 5/77* (2006.01)

(52) U.S. Cl.
CPC ....... *G01N 21/8806* (2013.01); *G03B 17/561* (2013.01); *H04N 5/2251* (2013.01); *H04N 5/23203* (2013.01); *H04N 5/77* (2013.01); *H04N 5/91* (2013.01)

(58) Field of Classification Search
CPC ...... G01B 11/00; G03B 17/561; G03B 13/20; G03B 15/00; G03B 17/38; G03B 2206/00; H04N 5/2251; H04N 5/23203; H04N 5/91; H04N 5/77
USPC ...................... 356/237.1–237.6, 239.1–239.8
See application file for complete search history.

(56) References Cited

U.S. PATENT DOCUMENTS

| | | | |
|---|---|---|---|
| 2016/0018897 A1* | 1/2016 | Nagai | G02B 27/017 345/156 |
| 2016/0112636 A1 | 4/2016 | Yamaguchi et al. | |
| 2016/0191862 A1 | 6/2016 | Yokomitsu et al. | |
| 2019/0220999 A1* | 7/2019 | Miyagaki | G06T 7/73 |

OTHER PUBLICATIONS

U.S. Appl. No. 16/362,840, filed Mar. 25, 2019, Kato et al.
U.S. Appl. No. 16/362,783, filed Mar. 25, 2019, Horiguchi et al.
U.S. Appl. No. 16/362,800, filed Mar. 25, 2019, Nakamura et al.
U.S. Appl. No. 16/362,823, filed Mar. 25, 2019, Miyagaki et al.
U.S. Appl. No. 16/362,874, filed Mar. 25, 2019, Kato et al.

* cited by examiner

FIG. 9

INSPECTION DEVICE

CROSS REFERENCE TO RELATED APPLICATIONS

The present application is a continuation application of International Patent Application No. PCT/JP2017/034894 filed on Sep. 27, 2017, which designated the United States and claims the benefit of priority from Japanese Patent Application No. 2016-190100 filed on Sep. 28, 2016. The entire disclosures of the above applications are incorporated herein by reference.

TECHNICAL FIELD

The present disclosure relates to an inspection device.

BACKGROUND

In the manufacturing process of a product, the quality of an object to be inspected such as a product at an intermediate stage (hereinafter referred to as "workpiece") or a finished product may be visually inspected by a worker. In this case, a wearable camera may support the inspection work by capturing images.

SUMMARY

An inspection device of the present disclosure may include an image acquisition unit that acquires image data including an inspection object, the image data being captured by a wearable camera attached to a worker inspecting the inspection object, an inspection state acquisition unit that acquires inspection state information for calculating at least one of a deviation distance from a regulation distance or a deviation angle from a regulation angle with respect to the inspection object of the worker, and an image correction unit that calculates at least one of the deviation distance or the deviation angle based on the image data and the inspection state information and corrects the image data.

DETAILED DESCRIPTION

Hereinafter, the present embodiments will be described with reference to the attached drawings. In order to facilitate the ease of understanding, the same reference numerals are attached to the same constituent elements in each drawing where possible, and redundant explanations are omitted.

Figure 1:
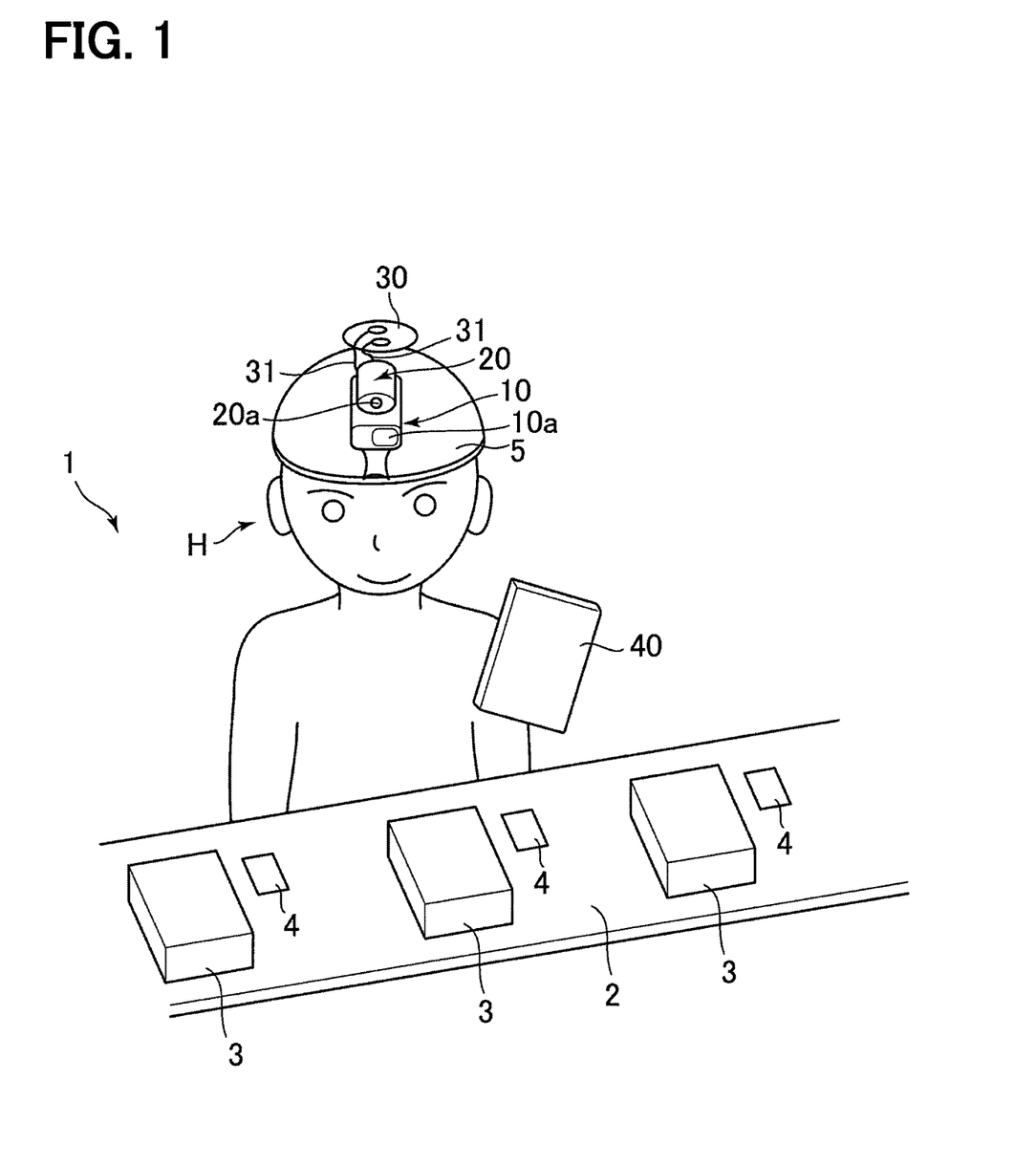
FIG. 1 is a diagram for explaining a usage state of an inspection device according to a first embodiment.
Figure 2:
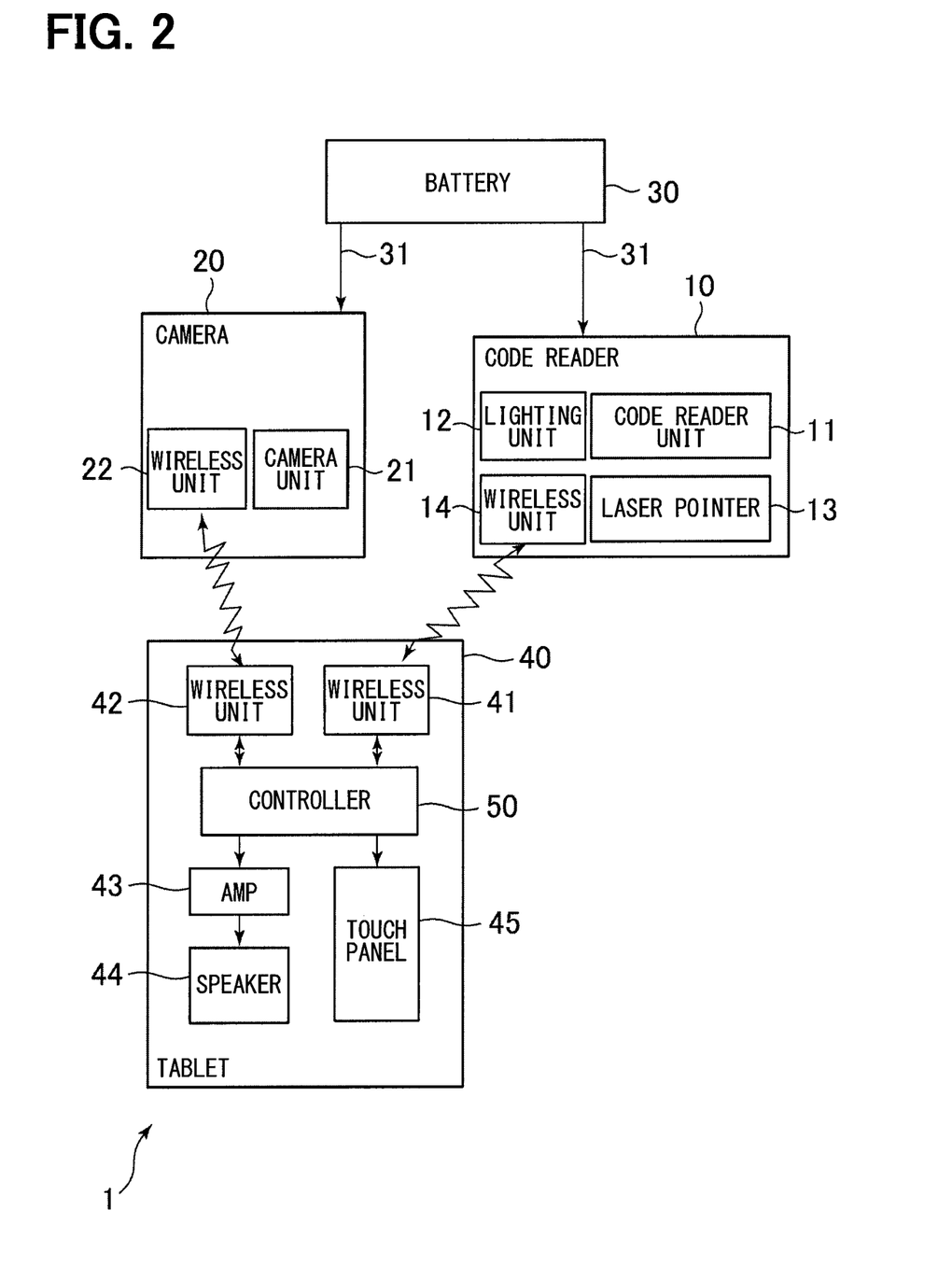
FIG. 2 is a block configuration diagram showing the configuration of the inspection device shown in FIG. 1.

With reference to FIG. 1 and FIG. 2, an example of an inspection work to which an inspection device 1 according to a first embodiment is applied and a schematic configuration of the inspection device 1 will be described.

As shown in FIG. 1, the inspection device 1 according to the first embodiment is used in the manufacturing process of a product such as a heat exchanger. Specifically, the inspection device 1 is used in an inspection work for determining whether or not an object to be inspected, such as the workpiece 3 at an intermediate manufacturing stage or a finished product, are good products.

A worker H of the inspection work inspects whether or not the workpieces 3 sequentially conveyed by a conveyor 2 are good. On the conveyor 2, a plurality of sets of workpieces 3 and signboards 4 are placed. The conveyor 2 conveys these sets so that a plurality of the sets are sequentially arranged in front of the workers H. The signboard 4 is arranged near its corresponding workpiece 3, and a code indicating the type of the workpiece 3 is displayed on that signboard 4.

The worker H can perform the above-described inspection work using the inspection device 1 of the present embodiment. As shown in FIGS. 1 and 2, the inspection device 1 includes a code reader 10, a wearable camera 20, a battery 30, and a tablet 40.

As shown in FIG. 2, the code reader 10 includes a code reader unit 11, a lighting unit 12, a laser pointer unit 13, and a wireless unit 14.

The code reader unit 11 a well known optical code reader including a light source that irradiates light. Light is emitted from the light source through lens 10a, reflected by the signboard 4, and received through the lens 10a. The code reader unit 11 reads this reflected light to read codes. Here, the signboard 4 of the present embodiment is a display board on which a code is displayed. The code is an identification indicator indicating the type of the workpiece 3. Various codes, such as a QR code (registered trademark) or a bar code, may be used as the code.

The lighting unit 12 illuminates the workpiece 3 and its surroundings through the lens 10a.

The laser pointer unit 13 irradiates a laser beam as a pointer through the lens 10a. Thus, the laser pointer unit 13 assists the worker H to recognize a target reading area in which the code reader unit 11 reads codes. In the present embodiment, the region irradiated with the laser beam by the laser pointer unit 13 is set to coincide with the target reading area of the code reader unit 11.

The wireless unit 14 is composed of an antenna, a wireless circuit, and the like, and wirelessly communicates with the wireless unit 41 of the tablet 40.

The wearable camera 20 is a compact camera which is attached to a body or the like and is intended to capture images in a hands-free manner. As shown in FIG. 2, the wearable camera 20 includes a camera unit 21 and a wireless unit 22. The camera unit 21 captures images of the workpiece 3 as an target imaging object using the light received via lens 20a. The wireless unit 22 is composed of an antenna, a wireless circuit, and the like, and wirelessly communicates with the wireless unit 42 of the tablet 40.

The battery 30 is a secondary battery that supplies direct current power to the code reader 10 and the camera 20 via a harness 31 or the like.

In the present embodiment, as shown in FIG. 1, the code reader 10, the wearable camera 20, and the battery 30 are mounted on a hat 5 to be work by the worker H. Further, the code reader 10 and the wearable camera 20 are installed on the hat 5 of the worker H so that the lens 10a of the code reader 10 and the lens 20a of the wearable camera 20 are disposed facing the front of the worker H.

The tablet 40 is a portable terminal configured to be carried by the worker H. As shown in FIG. 2, the tablet 40 includes wireless units 41 and 42, an amplifier 43, a speaker 44, a touch panel 45, and a controller 50.

The wireless units 41 and 42 are composed of an antenna, a wireless circuit, and the like. The wireless unit 41 wirelessly communicates with the wireless unit 14 of the code reader 10. The wireless unit 42 wirelessly communicates with the wireless unit 22 of the wearable camera 20. In the present embodiment, various types of short range wireless communications may be used for wireless communication between the wireless units. Bluetooth (registered trademark) or Wi-Fi (registered trademark) can be used as the short-range wireless communication.

The amplifier 43 amplifies the voltage of the analog signal output from the controller 50 and outputs an amplified signal. The speaker 44 converts the amplified signal output from the amplifier 43 into sound and outputs the sound. The touch panel 45 is a display device combining a transparent key input operation unit and a display panel.

The controller 50 is a device that controls the operation of each part of the inspection device 1 related to the above-described inspection work. The controller 50 is physically a microcontroller composed of a CPU, a memory, digital-analog conversion circuits, and the like. The controller 50 executes an inspection process in accordance with a computer program stored in advance in the memory. The inspection process is a determination process of determining whether or not the workpiece 3 is a non-defective product based on the code acquired from the code reader 10 and the captured image acquired by the wearable camera 20.

In the memory, a plurality of kinds of reference images are stored in advance. The reference images include still images or videos, and are used for determining whether or not the workpiece 3 is a non-defective item. Each reference image includes a non-defective product image showing a workpiece 3 which is a non-defective product and a defective product image showing a defective workpiece 3. The digital-analog conversion circuit outputs an analog signal representing a sound based on a command of the CPU.

In the present embodiment, the tablet 40 is carried by the worker H, for example, stored in a pocket of the worker H, or is placed in the vicinity of the worker H.

By using the inspection device 1 configured in this way, the standard work for the inspection process for the workpiece 3 as performed by the worker H may be, for example, performed as follows.

First, the worker H directs their head to face the signboard 4, so that the code reader 10 attached to the hat 5 reads the code from the signboard 4. Next, the head is directed to face the workpiece 3, and the wearable camera 20 attached to the hat 5 likewise captures the image of the workpiece 3 to acquire the captured image. That is, using the code reader 10 reading the code from the signboard 4 as a trigger, the wearable camera 20 acquires the captured image of the workpiece 3. The tablet 40 receives the code from the code reader 10 via wireless communication and receives the captured image from the wearable camera 20.

The controller 50 in the tablet 40 selects the reference image corresponding to the received code from the plurality of types of reference images stored in advance in the memory as described above. The controller 50 compares the captured image of the workpiece 3 with the reference image to determine whether or not the workpiece 3 is a non-defective product. In addition, the controller 50 notifies the worker H of the result of pass/fail determination of the workpiece 3 via sound information or visual information using the speaker 44 of the tablet 40 or the touch panel 45 of the tablet 40.

The worker H continues to the next work based on the information of the determination result outputted from the tablet 40. For example, if it is determined that the workpiece 3 is a non-defective product, the next workpiece 3 on the conveyor 2 is inspected.

The inspection device 1 configured as described above is carried by the worker H as a wearable device so that both hands of the worker H are free. With the above configuration, the inspection device 1 can automatically perform the inspection work for the inspection object without requiring any operation using the hands of the worker H, and supports the inspection work of the worker H so that the burden on the worker H can be reduced. In addition, since the worker H is in a hands-free state during the inspection work, the worker H can perform other work (such as screw tightening) aside from the inspection while performing the inspection work of the workpiece 3, and efficiency can be improved.

Figure 3:
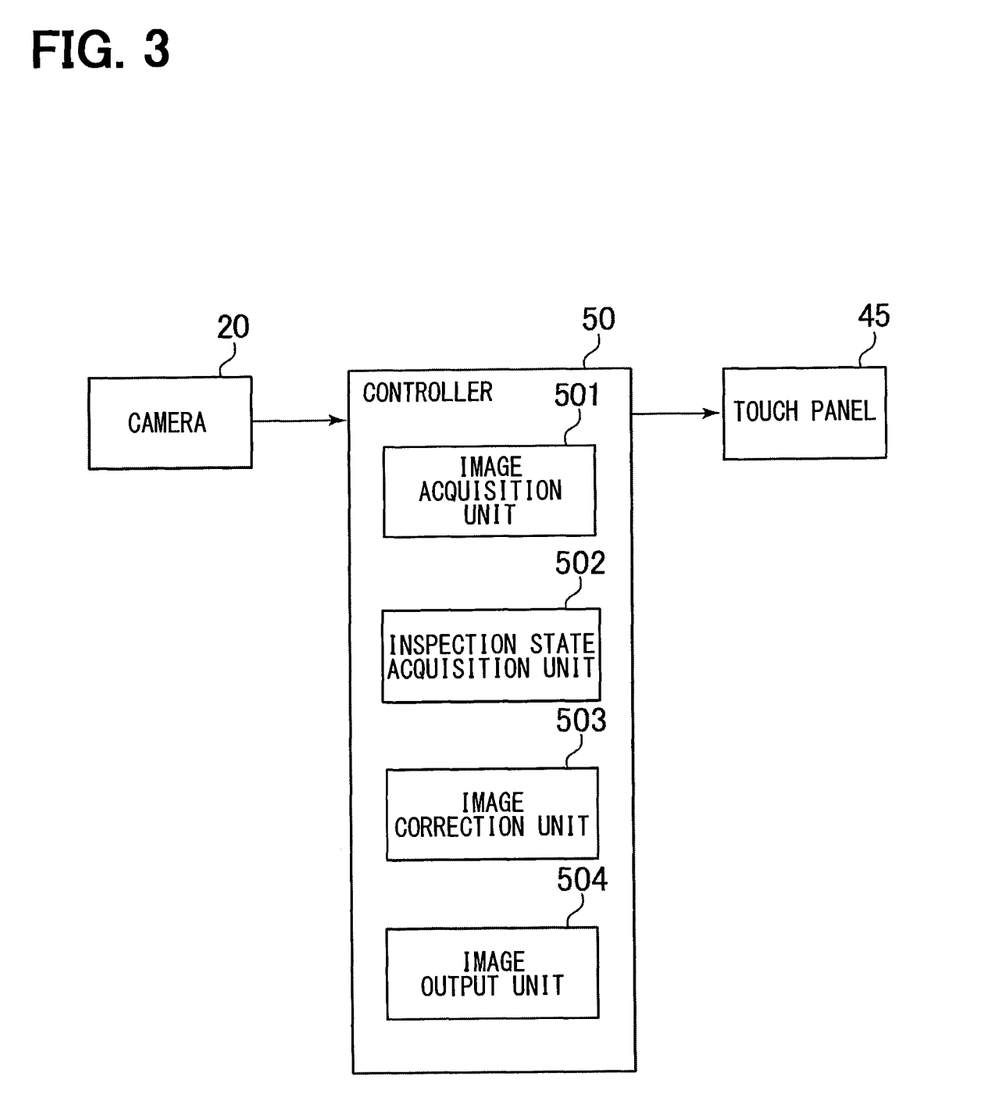
FIG. 3 is a block configuration diagram showing a functional configuration of a controller shown in FIG. 2.

Next, functional components of the controller 50 and their operations will be described with reference to FIG. 3. The controller 50 includes, as functional components, an image acquisition unit 501, an inspection state acquisition unit 502, an image correction unit 503, and an image output unit 504.

The image acquisition unit 501 acquires image data output from the wearable camera 20.

Figure 4:
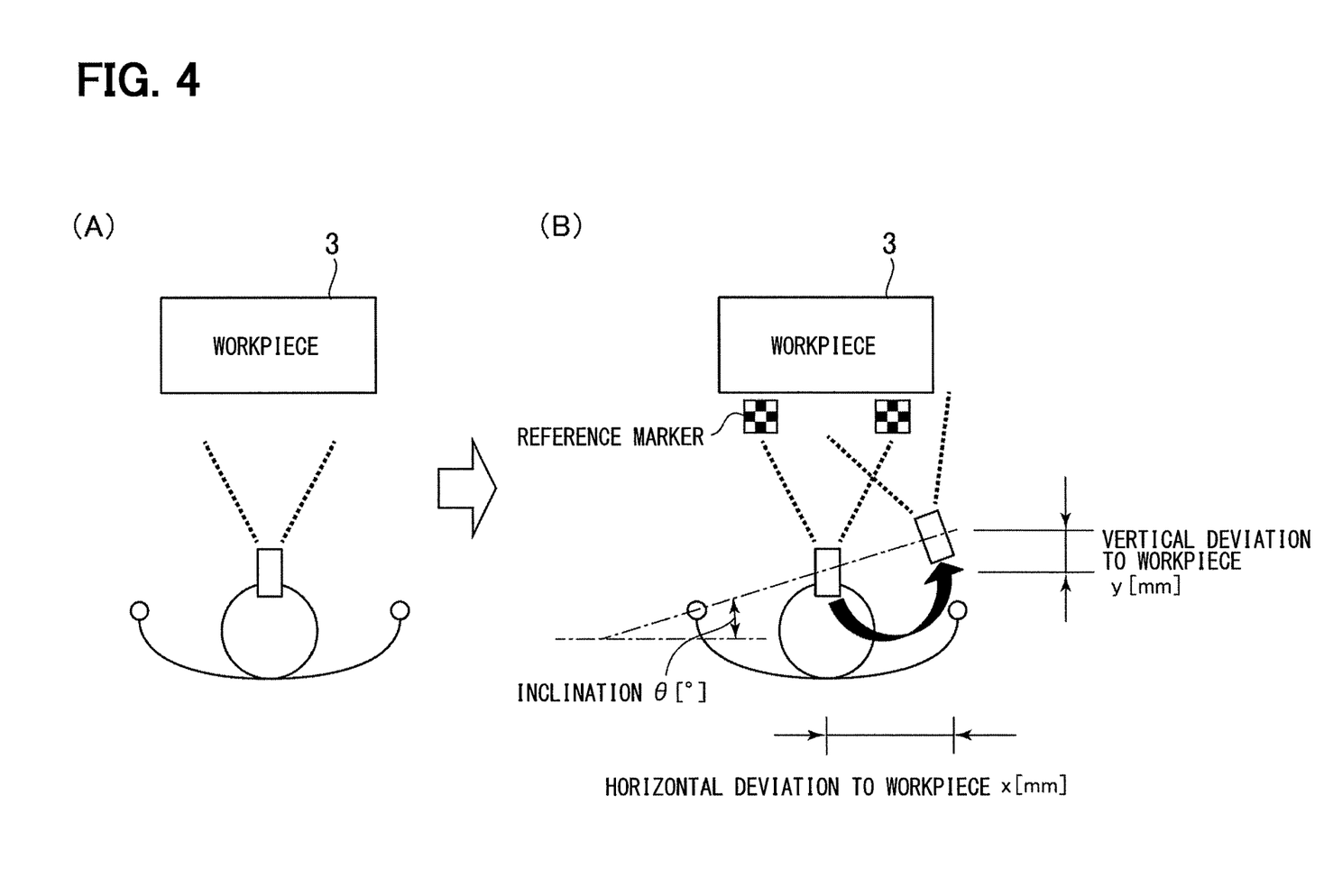
FIG. 4 is a diagram for explaining image correction for an inspection device according to a first embodiment.

The inspection state acquisition unit 502 acquires inspection state information for calculating at least one of: a deviation distance from a regulation distance or a deviation angle from a regulation angle, with respect to the workpiece 3 which is the inspection object of the worker H. Specifically, as shown in FIG. 4, the acquired inspection state information is used to calculate the worker H shifting from the (A) state in which the worker H is facing forward toward the workpiece 3 to the (B) state in which the worker is in a deviated state. The inspection state information includes shape information of reference markers which is used to calculate an inclination θ, a workpiece horizontal deviation x, and a workpiece vertical deviation y of the worker H.

Figure 5:
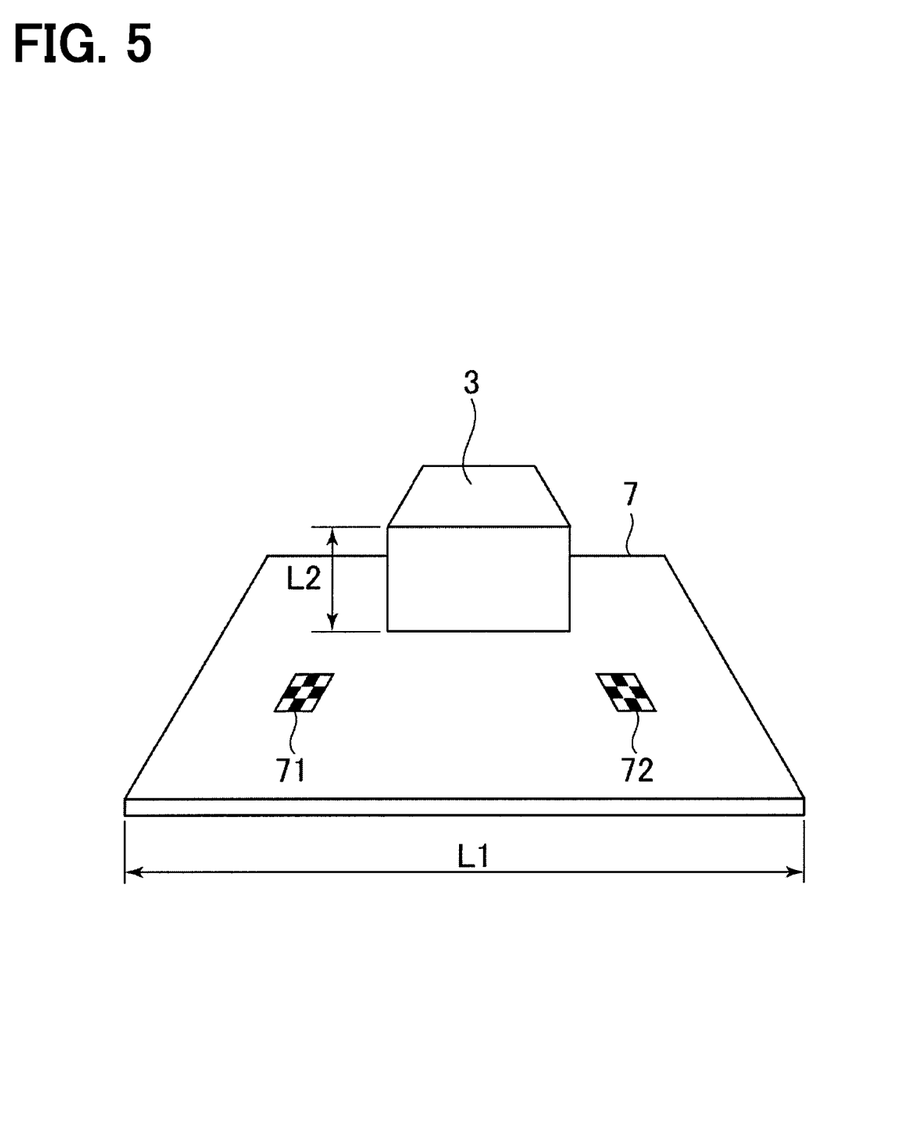
FIG. 5 is a diagram for explaining image correction for an inspection device according to a first embodiment.

As shown in FIG. 5, reference markers 71, 72 are provided on the pallet 7 on which the workpiece 3 is placed. Since a pair of reference markers 71, 72 are provided, when the worker H is not facing forward toward the workpiece 3 and the pallet 7, the imaged shapes of the reference markers 71, 72 change.

Figure 6:
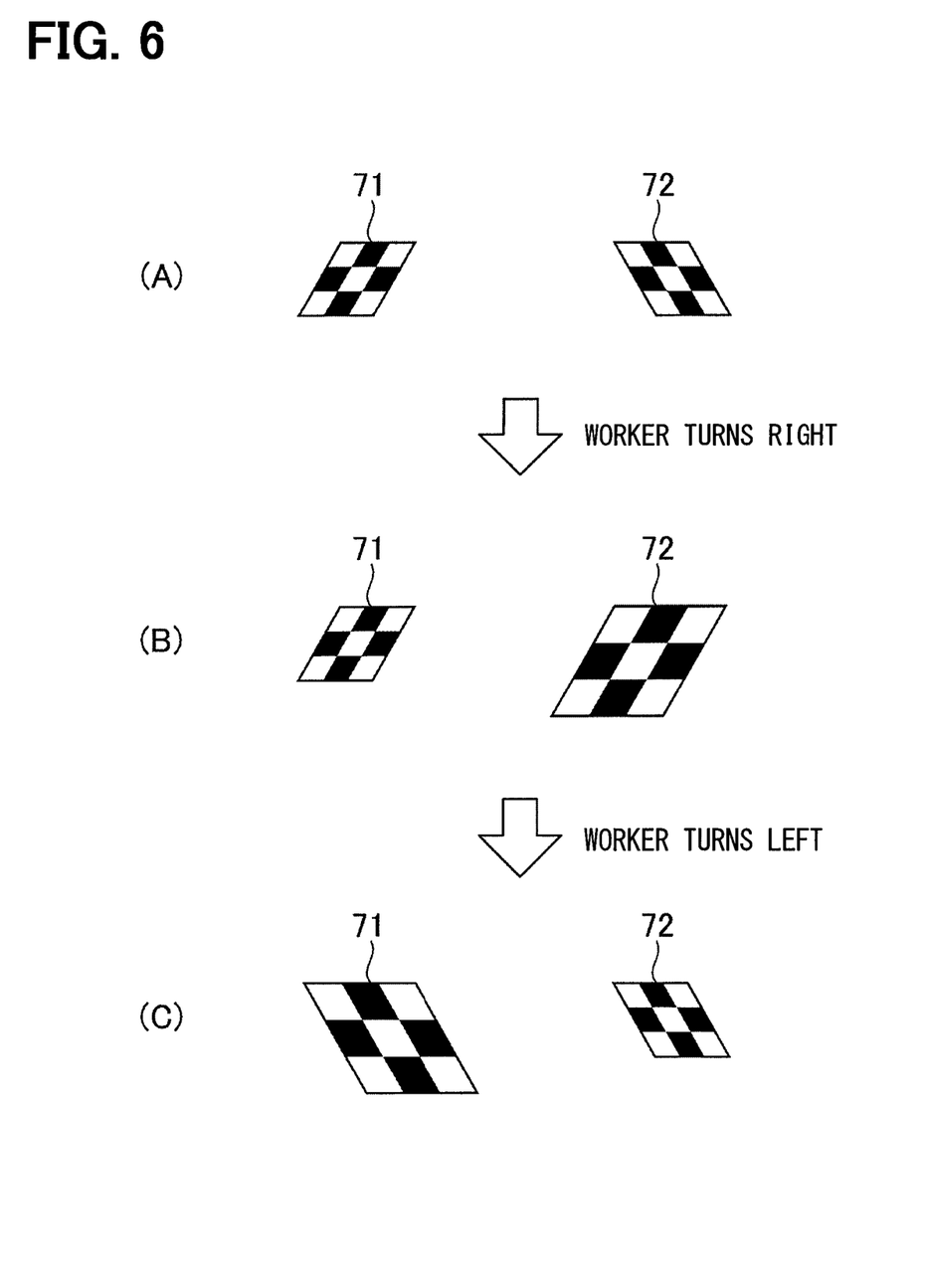
FIG. 6 is a diagram for explaining image correction for an inspection device according to a first embodiment.

As shown in FIG. 6 (A), when the worker H is facing straight forward toward the workpiece 3 and the pallet 7, both the reference marker 71 and the reference marker 72 are imaged with the same shape and the same size. However, as shown in FIG. 6 (B), when the worker H deviates and shifts toward the right with respect to the workpiece 3 and the pallet 7, the reference marker 72 is imaged larger than the reference marker 71. Further, the imaged shapes of the reference markers 71, 72 vary according to the degree to which the worker H shifts toward the right. Further, as shown in FIG. 6 (C), when the worker H deviates and shifts toward the left with respect to the workpiece 3 and the pallet 7, the reference marker 71 is imaged larger than the reference marker 72. Further, the imaged shapes of the reference markers 71, 72 vary according to the degree to which the worker H shifts toward the left.

The image correction unit 503 calculates at least one of the deviation distance or the deviation angle based on the image data and the inspection state information, and corrects the image data. Specifically, the image correction unit 503 calculates at least one of the deviation distance or the deviation angle from the shapes of the reference markers 71, 72 and the image data.

The image output unit 504 outputs the corrected image data, which is corrected by the image correction unit 503, to the touch panel 45. The touch panel 45 displays the corrected image data.

The inspection device 1 according to the first embodiment as described above includes the image acquisition unit 501 that acquires image data including the workpiece 3 which is the inspection object, the image data being captured by the wearable camera 20 attached to the worker H inspecting the workpiece 3, the inspection state acquisition unit 502 that acquires inspection state information for calculating at least one of the deviation distances x, y from the regulation distance or the deviation angle θ from the regulation angle with respect to the workpiece 3 of the worker H, and the image correction unit 503 that calculates at least one of the deviation distances x, y or the deviation angle θ based on the image data and the inspection state information and corrects the image data.

In the present embodiment, at least one of the deviation distance x, the deviation distance y, or the deviation angle θ is calculated based on the image data and the inspection state information, and the image data is corrected. Therefore, even if the worker H deviates from a regulation position during the inspection, it is possible to perform a correction as if the worker H is performing the inspection from the regulation position.

Further, in the inspection device 1, the inspection state information acquisition unit 502 acquires, as inspection state information, the shapes of the reference markers 71, 72 imaged together with the inspection target workpiece 3 in the image data. Then, the image correction unit 503 calculates at least one of the deviation distance or the deviation angle from the degree to which the shapes of the reference markers 71, 72 have changed from a standard shape.

Since at least one of the deviation distance or the deviation angle can be calculated based on the change in shape of the reference markers 71, 72, it is possible to calculate at least one of the deviation distance and the deviation angle with only one monocular camera.

Further, in the present embodiment, the inspection state acquisition unit 502 acquires, as inspection state information, position specifying information imaged together with the inspection target workpiece 3 in the image data. Then, the image correction unit 503 is able to also calculate at least one of the deviation distance or the deviation angle from the relative positional relationship between the workpiece 3 and the position specifying information.

The position specifying information may be a lattice-shaped pattern on the portion where the workpiece 3 is placed. By applying the lattice-shaped pattern of the reference markers 71 and 72 as shown in FIG. 5 to the entire pallet 7, position specifying information can be obtained by counting the number of grids up to the portion where the pattern is visibly obscured.

The position specifying information may be known shape information in a portion where the workpiece 3 is placed. As shown in FIG. 5, by calculating the ratio between the dimension L1 of the pallet 7, which is the known shape information, and the dimension L2 of the measurement target portion of the workpiece 3, it is possible to specify the arrangement position of the workpiece 3 with respect to the pallet 7.

Figure 7:
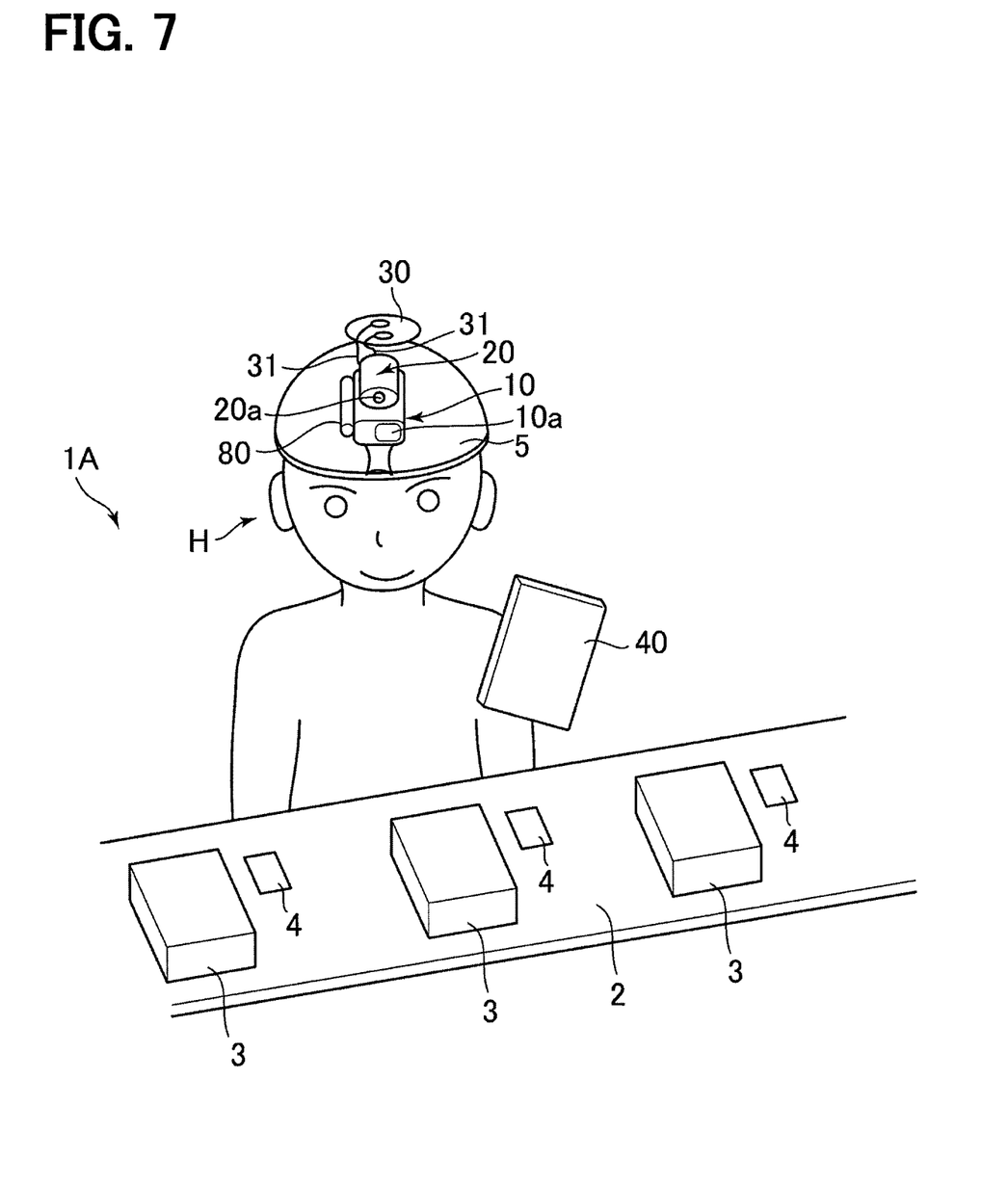
FIG. 7 is a diagram for explaining a usage state of an inspection device according to a second embodiment.
Figure 8:
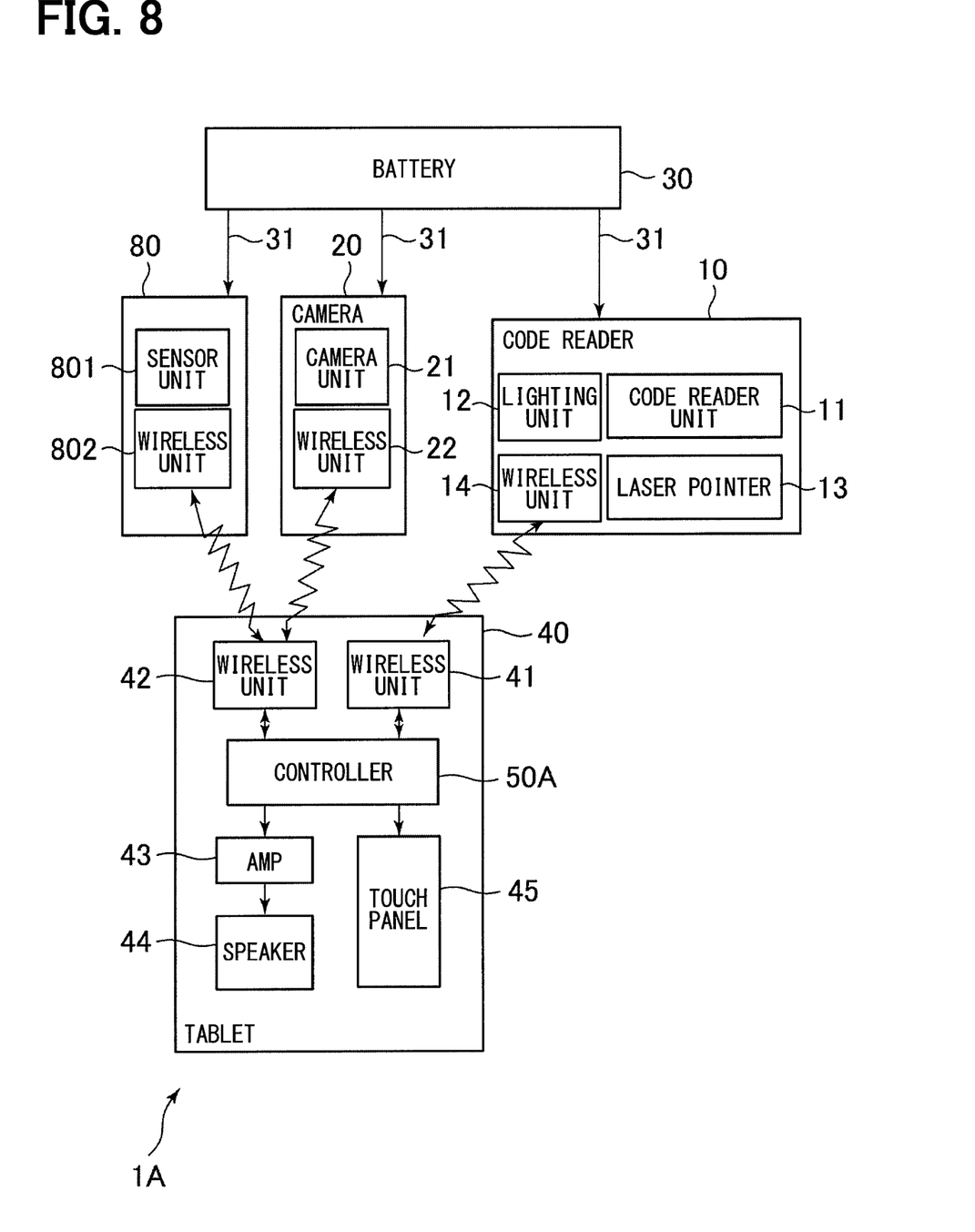
FIG. 8 is a block configuration diagram showing the configuration of the inspection device shown in FIG. 7.

With reference to FIG. 7 and FIG. 8, an example of an inspection work to which an inspection device 1A according to a second embodiment is applied and a schematic configuration of the inspection device 1A will be described.

As shown in FIG. 7, the inspection device 1A according to the second embodiment is used in the manufacturing process of a product such as a heat exchanger. Specifically, the inspection device 1 is used in an inspection work for determining whether or not an object to be inspected, such as the workpiece 3 at an intermediate manufacturing stage or a finished product, are good products. Since the inspection work itself is the same as in the inspection device 1, explanation thereof is omitted.

As shown in FIGS. 7 and 8, the inspection device 1A includes a code reader 10, a wearable camera 20, a battery 30, a motion sensor 80, and a tablet 40.

As shown in FIG. 8, the code reader 10 includes a code reader unit 11, a lighting unit 12, a laser pointer unit 13, and a wireless unit 14. Since the code reader 10 is the same as in the inspection device 1, explanation thereof will be omitted.

The wearable camera 20 is a compact camera which is attached to a body or the like and is intended to capture images in a hands-free manner. As shown in FIG. 2, the wearable camera 20 includes a camera unit 21 and a wireless unit 22. Since the wearable camera 20 is the same as in the inspection device 1, explanation thereof will be omitted.

The battery 30 is a secondary battery that supplies direct current power to the code reader 10 and the camera 20 via a harness 31 or the like.

The motion sensor 80 is a sensor for detecting movements of the worker H. The motion sensor 80 includes a sensor unit 801 and a wireless unit 802. The sensor unit 801 is formed by a plurality of acceleration sensors, and outputs the motion of the worker H as inspection state information. The wireless unit 802 communicates with the wireless unit 42 and transmits the inspection state information to the tablet 40.

In the present embodiment, as shown in FIG. 7, the code reader 10, the wearable camera 20, the battery 30, and the motion sensor are mounted on a hat 5 to be work by the worker H. Further, the code reader 10 and the wearable camera 20 are installed on the hat 5 of the worker H so that the lens 10a of the code reader 10 and the lens 20a of the wearable camera 20 are disposed facing the front of the worker H.

Figure 9:
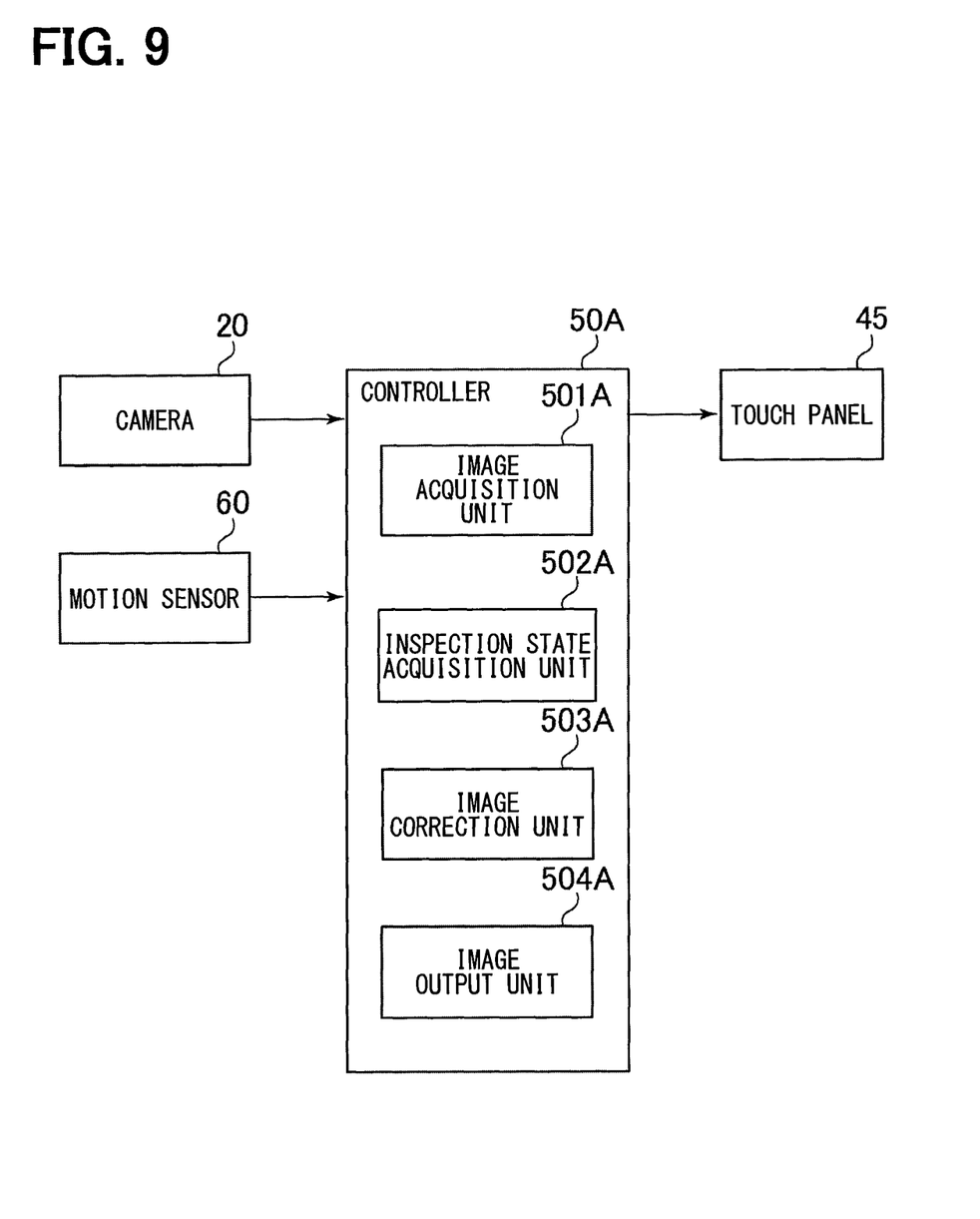
FIG. 9 is a block configuration diagram showing a functional configuration of a controller shown in FIG. 8.

The tablet 40 is a portable terminal configured to be carried by the worker H. As shown in FIG. 9, the tablet 40 includes wireless units 41 and 42, an amplifier 43, a speaker 44, a touch panel 45, and a controller 50A.

The wireless units 41 and 42 are composed of an antenna, a wireless circuit, and the like. The wireless unit 41 wirelessly communicates with the wireless unit 14 of the code reader 10. The wireless unit 42 wirelessly communicates with the wireless unit 22 of the wearable camera 20 and the wireless unit 802 of the motion sensor 80. In the present embodiment, various types of short range wireless communications may be used for wireless communication between the wireless units. Bluetooth (registered trademark) or Wi-Fi (registered trademark) can be used as the short-range wireless communication.

The amplifier 43 amplifies the voltage of the analog signal output from the controller 50A and outputs an amplified signal. The speaker 44 converts the amplified signal output from the amplifier 43 into sound and outputs the sound. The touch panel 45 is a display device combining a transparent key input operation unit and a display panel.

The controller 50A is a device that controls the operation of each part of the inspection device 1A related to the above-described inspection work. The controller 50A is physically a microcontroller composed of a CPU, a memory, digital-analog conversion circuits, and the like. The controller 50A executes an inspection process in accordance with a computer program stored in advance in the memory. The inspection process is a determination process of determining whether or not the workpiece 3 is a non-defective product based on the code acquired from the code reader 10 and the captured image acquired by the wearable camera 20.

In the memory, a plurality of kinds of reference images are stored in advance. The reference images include still images or videos, and are used for determining whether or not the workpiece 3 is a non-defective item. Each reference image includes a non-defective product image showing a workpiece 3 which is a non-defective product and a defective product image showing a defective workpiece 3. The digital-analog conversion circuit outputs an analog signal representing a sound based on a command of the CPU.

In the present embodiment, the tablet 40 is carried by the worker H, for example, stored in a pocket of the worker H, or is placed in the vicinity of the worker H.

By using the inspection device 1A configured in this way, the standard work for the inspection process for the workpiece 3 as performed by the worker H may be in the same manner as for the inspection device 1, and thus explanation thereof is omitted.

Next, functional components of the controller 50A and their operations will be described with reference to FIG. 9. The controller 50A includes, as functional components, an image acquisition unit 501A, an inspection state acquisition unit 502A, an image correction unit 503A, and an image output unit 504A.

The image acquisition unit 501A acquires image data output from the wearable camera 20.

The inspection state acquisition unit 502A acquires inspection state information for calculating at least one of: a deviation distance from a regulation distance or a deviation angle from a regulation angle, with respect to the workpiece 3 which is the inspection object of the worker H. Specifically, the inspection state information includes the motions of the worker H measured by the motion sensor 80 which is used to calculate an inclination θ, a workpiece horizontal deviation x, and a workpiece vertical deviation y of the worker H.

The image correction unit 503A calculates at least one of the deviation distance or the deviation angle based on the image data and the inspection state information, and corrects the image data. The image correction unit 503 A calculates at least one of the deviation distance or the deviation angle from the motion information of the worker H measured by the motion sensor 80.

The image output unit 504A outputs the corrected image data, which is corrected by the image correction unit 503A, to the touch panel 45. The touch panel 45 displays the corrected image data.

The inspection device 1A according to the second embodiment as described above includes the image acquisition unit 501A that acquires image data including the workpiece 3 which is the inspection object, the image data being captured by the wearable camera 20 attached to the worker H inspecting the workpiece 3, the inspection state acquisition unit 502A that acquires inspection state information for calculating at least one of the deviation distances x, y from the regulation distance or the deviation angle θ from the regulation angle with respect to the workpiece 3 of the worker H, and the image correction unit 503A that calculates at least one of the deviation distances x, y or the deviation angle θ based on the image data and the inspection state information and corrects the image data.

In the present embodiment, at least one of the deviation distance x, the deviation distance y, or the deviation angle θ is calculated based on the image data and the inspection state information, and the image data is corrected. Therefore, even if the worker H deviates from a regulation position during the inspection, it is possible to perform a correction as if the worker H is performing the inspection from the regulation position.

The inspection state acquisition unit 502A acquires the inspection state information in the form of motion information output from the motion sensor 80 that acquires the motions of the worker H. Then, the image correction unit 503A acquires the motion state of the worker H from the motion information, and calculates at least one of the deviation distance and the deviation angle.

Further, in the present embodiment, the inspection state acquisition unit 502 acquires, as inspection state information, position specifying information imaged together with the inspection target workpiece 3 in the image data. Then, the image correction unit 503 is able to also calculate at least one of the deviation distance or the deviation angle from the relative positional relationship between the workpiece 3 and the position specifying information.

The position specifying information may be a lattice-shaped pattern on the portion where the workpiece 3 is placed. By applying the lattice-shaped pattern of the reference markers 71 and 72 as shown in FIG. 5 to the entire pallet 7, position specifying information can be obtained by counting the number of grids up to the portion where the pattern is visibly obscured.

The position specifying information may be known shape information in a portion where the workpiece 3 is placed. As shown in FIG. 5, by calculating the ratio between the dimension L1 of the pallet 7, which is the known shape information, and the dimension L2 of the measurement target portion of the workpiece 3, it is possible to specify the arrangement position of the workpiece 3 with respect to the pallet 7.

The present embodiments have been described with reference to specific examples above. However, the present disclosure is not limited to those specific examples. Those specific examples subjected to an appropriate design change by those skilled in the art are also encompassed in the scope of the present disclosure as long as the changed examples have the features of the present disclosure. Each element included in each of the specific examples described above and the placement, condition, shape, and the like of each element are not limited to those illustrated, and can be changed as appropriate. The combinations of elements included in each of the above described specific examples can be appropriately modified as long as no technical inconsistency occurs.

The invention claimed is:

1. An inspection device, comprising:
a processor and memory configured to:
  acquire image data including an inspection object, the image data being captured by a wearable camera attached to a worker inspecting the inspection object;
  acquire inspection state information for calculating at least one of a deviation distance from a regulation distance or a deviation angle from a regulation angle with respect to the inspection object of the worker;

calculate at least one of the deviation distance or the deviation angle based on the image data and the inspection state information and correct the image data;

acquire, as the inspection state information, reference markers imaged together with the inspection object in the image data; and calculate at least one of the deviation distance or the deviation angle from a degree of change in the shapes of the reference markers with respect to a standard shape;

wherein the inspection object is a manufacturing object separate from the worker.

2. An inspection device comprising:

a processor and memory configured to:

acquire image data including an inspection object, the image data being captured by a wearable camera attached to a worker inspecting the inspection object;

acquire inspection state information for calculating at least one of a deviation distance from a regulation distance or a deviation angle from a regulation angle with respect to the inspection object of the worker;

calculate at least one of the deviation distance or the deviation angle based on the image data and the inspection state information and correct the image data;

acquire, as the examination state information, motion information output from a motion sensor that acquires motions of the worker; and acquire a motion state of the worker from the motion information to calculate at least one of the deviation distance or the deviation angle;

wherein the inspection object is a manufacturing object separate from the worker.

3. The inspection device according to claim 1, wherein the processor and memory are further configured to acquire, as correction to the inspection state information, position specifying information imaged together with the inspection object in the image, and correct the inspection state information using the position specifying information to calculate at least one of the deviation distance or the deviation angle.

4. The inspection device according to claim 3, wherein the position specifying information is a lattice-shaped pattern on a portion where the inspection object is placed.

5. The inspection device according to claim 3, wherein the position specifying information is a known shape information of a portion where the inspection object is placed.

* * * * *